United States Patent
Choi et al.

(10) Patent No.: US 6,881,798 B2
(45) Date of Patent: Apr. 19, 2005

(54) METHOD OF PREPARING EXFOLIATED NITROPOLYMER/SILICATE NANOCOMPOSITES AND THE NANOCOMPOSITES PREPARED BY THE METHOD

(75) Inventors: Yeong Suk Choi, Daejon-Shi (KR); In Jae Chung, Daejon-Shi (KR); Sung Chul Kim, Daejon-Shi (KR)

(73) Assignee: Samsung Atofina Co. Ltd. (KR)

( * ) Notice: Subject to any disclaimer, the term of this patent is extended or adjusted under 35 U.S.C. 154(b) by 0 days.

(21) Appl. No.: 10/345,191

(22) Filed: Jan. 16, 2003

(65) Prior Publication Data

US 2005/0065248 A1 Mar. 24, 2005

(30) Foreign Application Priority Data

Jul. 22, 2002 (KR) .............................. 10-2002-0042905

(51) Int. Cl.[7] ................................................ C08F 2/24
(52) U.S. Cl. ...................... 525/341; 525/130; 524/565; 524/445; 524/186; 524/447; 523/210
(58) Field of Search ................................ 524/565, 445, 524/186, 447; 523/210, 40; 525/341, 130

(56) References Cited

U.S. PATENT DOCUMENTS

| | | | |
|---|---|---|---|
| 5,296,627 A | * | 3/1994 | Tang et al. .................... 558/34 |
| 5,883,173 A | * | 3/1999 | Elspass et al. ............... 524/446 |
| 2002/0055581 A1 | * | 5/2002 | Lorah et al. ................. 524/445 |
| 2002/0086908 A1 | * | 7/2002 | Chou et al. .................... 516/98 |

OTHER PUBLICATIONS

Choi et al., Synthesis of exfoliated polyacrylonitrile/Na–MMT nanocomposites via emulsion polymerization, Chem. Mater. 2002, vol. 14, pp 2936–2939.*

Choi et al., Synthesis of Exfoliated Polyacrylonitrile/Na–MMT Nanocomposites via Emulsion Polymerization, Chem. Mater. 2002, vol. 14, pp. 2936–2939.

* cited by examiner

Primary Examiner—Tatyana Zalukaeva
Assistant Examiner—Satya Sastri
(74) Attorney, Agent, or Firm—Blank Rome LLP

(57) ABSTRACT

Disclosed is a preparation method of an exfoliated nitropolymer/silicate nanocomposite by emulsion polymerization of monomers forming the polymer in an aqueous dispersion of non-modified, layered silicate in the presence of a reactive emulsifier having both a radical-polymerizable vinyl group and a functional group with affinity for silicate. In the process of the polymerization, silicate is fully exfoliated and uniformly dispersed in the polymer. Therefore, only a small amount of silicate is sufficient to improve thermal and mechanical properties of the polymer. Further, the method is advantageous in terms of a simple preparation process due to no use of organo-modified silicate, thus achieving an economic benefit.

12 Claims, 4 Drawing Sheets

METHOD OF PREPARING EXFOLIATED NITROPOLYMER/SILICATE NANOCOMPOSITES AND THE NANOCOMPOSITES PREPARED BY THE METHOD

BACKGROUND OF THE INVENTION

1. Field of the Invention

The present invention pertains, in general, to preparation methods of exfoliated nitropolymer/silicate nanocomposites and, more specifically, to a method of preparing a nitropolymer/silicate nanocomposite having an exfoliated structure using a pure silicate which is not organically modified.

2. Description of the Prior Art

Compared to conventional microcomposites, polymer/silicate nanocomposites exhibit excellent mechanical properties and dimensional stability as well as decreased permeability to various gases even though silicate is added in a small amount. In addition, polymer/silicate nanocomposites have superior thermal stability and self-extinguishing property. The reason for these properties is that individual layers of silicate dispersed uniformly in polymer matrixes exist in plate-like shapes, and thus have high aspect ratios and large surface areas capable of interacting with the polymer.

Due to such superior properties as described above, the polymer/silicate nanocomposites have a variety of industrial applications. Practically, commercialization of the nanocomposites is progressing in USA, Europe and Japan. For instance, a nylon-layered silicate nanocomposite is applied as a timing-belt cover of automobiles by Toyota Group, Japan.

Polymer/silicate nanocomposites are classified into intercalated forms and exfoliated forms. Intercalated nanocomposites have structures wherein spaces between layers of silicate are widen due to the polymer intercalated between galleries of the silicates, while regularly layered structures of the silicates are maintained as they are. Meanwhile, exfoliated nanocomposites have structures wherein each layer of silicate is dispersed in a polymer matrix to the extent of completely disrupting the inherent regularity of silicate layers. The exfoliated nanocomposites have been known to be superior to the intercalated nanocomposites in physical properties. It has been surmised that this is due to the increased probability in the exfoliated form that polymer chains may contact silicate, provided that equal amount of silicate is used, which, in turn, enhances physical properties of the composite, such as modulus, self-extinguishing property, and dimensional stability.

However, the polymer/silicate nanocomposites are difficult to prepare. The silicates, which have hydrophilic surface and high attraction between layers, are hardly mixed with a hydrophobic polymer, and thus intercalation of the polymer cannot be expected. In conventional techniques, alkylammoniums are used to modify the hydrophilic surface of silicates to make them hydrophobic, and hydrophobic polymers are intercalated between the layers of modified silicates, to provide a nanocomposite.

There has been suggested various methods for intercalating polymers between layers of organo-modified silicates. For example, polymerization may be performed immediately after intercalating molten monomers or dissolved monomers into organo-modified silicates, to obtain nanocomposites. Alternatively, in a solution-intercalation method, a polymer may be dissolved in a solvent and then intercalated between layers of layered silicate. Finally, silicate may be added to a molten solution of crystalline polymer to prepare a nanocomposite.

All the methods mentioned above share a common feature of using organo-modified silicates. However, alkylammoniums, which are used for modification of surfaces of silicates, detrimentally affect thermal and mechanical properties of final nanocomposites. Hence, improvement of physical properties of the composite is made within the limit which a small quantity of organo-modified silicate permits. Further, excessive alkylammonium may migrate to the surface of the nanocomposite, rendering the nanocomposite harmful to the user. Moreover, in manufacturing installations, additional cost is required for making organo-modified silicates or for purchasing commercially available organo-modified silicates. Therefore, production cost of a final nanocomposite is increased, thus weakening the market competitiveness of the nanocomposite.

SUMMARY OF THE INVENTION

Therefore, it is an object of the present invention to overcome the problems encountered in the prior arts and to provide a method of preparing an exfoliated nitropolymer/silicate nanocomposite using a non-modified silicate, a pristine silicate.

It is another object of the present invention to provide an exfoliated nitropolymer/silicate nanocomposite prepared by the above method.

In accordance with a first aspect of the present invention, there is provided a method of preparing an exfoliated nitropolymer/silicate nanocomposite by emulsion polymerization, wherein said emulsion polymerization is performed using at least one monomer constituting the polymer and at least one non-modified, layered silicate in the presence of at least one reactive emulsifier having a radical-polymerizable vinyl group and a functional group with affinity for silicate.

In a preferable embodiment of the first aspect of the present invention, the method of preparing an exfoliated nitropolymer/silicate nanocomposite comprises the steps of (i) performing polymerization of a part of monomers comprising acrylonitrile in a water-dispersed liquid of non-modified, layered silicate in the presence of a reactive emulsifier having both a radical-polymerizable vinyl group and a functional group with affinity for silicate, to form initial particles; and (ii) additionally introducing the remnant of the monomers to the initial particles in the presence of a stabilizer stabilizing the initial particles, followed by performing polymerization.

In accordance with a second aspect of the present invention, there is provided an exfoliated nitropolymer/silicate nanocomposite prepared by emulsion polymerization of one or more monomers including acrylonitrile in a water-dispersed liquid of layered silicate in the presence of a reactive emulsifier having a radical-polymerizable vinyl group and a functional group with affinity for silicate.

DETAILED DESCRIPTION OF THE INVENTION

Figure 1A:
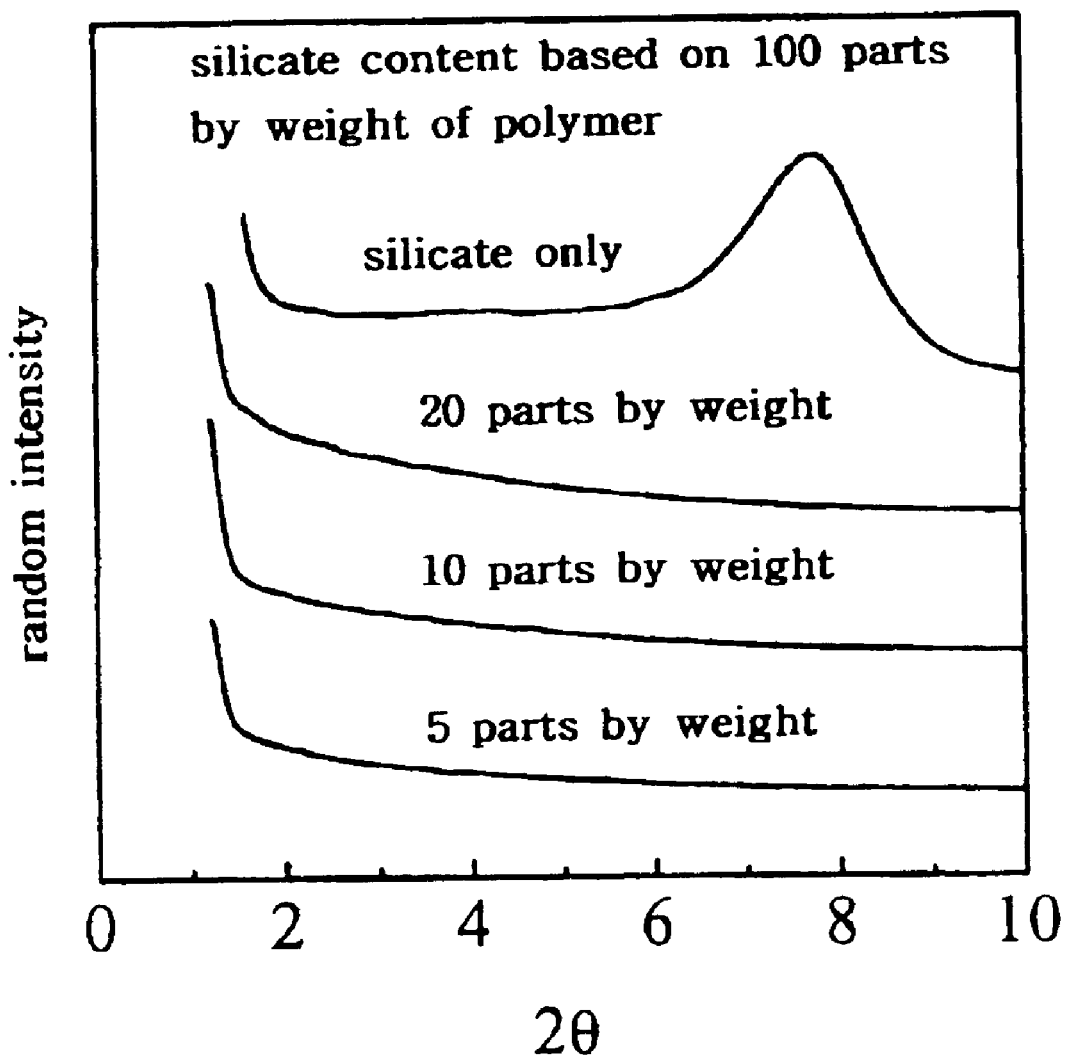
FIG. 1*a* shows X-ray diffraction patterns of exfoliated polyacrylonitrile/silicate nanocomposites according to the examples 1 to 3 of the present invention.

The present invention, aiming to preparation of an exfoliated nitropolymer/silicate nanocomposite by emulsion polymerization from constituent monomers and a silicate, is characterized by using a reactive emulsifier having both a radical-polymerizable vinyl group and a functional group with affinity for silicate, thereby directly preparing the nitropolymer/silicate nanocomposite from a non-modified, layered silicate without requiring organic modification of the silicate.

The emulsion polymerization may be conducted in a known manner such as seeded emulsion polymerization, semi-batch emulsion polymerization, and batch emulsion polymerization. Herein described is the semi-batch emulsion polymerization, while the other emulsion polymerization may be easily accomplished by those skilled in the art. Further, reaction conditions and addition amounts of each component as mentioned below are based on common practice in the art, and may be properly modified if necessary.

According to the emulsion polymerization of the present invention, non-modified, layered silicate is dispersed in deionized water to provide a water-dispersed liquid of silicate (hereinafter referred to as "silicate dispersion"). Then, 1–30 parts by weight of the silicate dispersion, 0.1–5 parts by weight of an initiator, 1–50 parts by weight of a monomer, 50–450 parts by weight of a dispersion medium (deionized water), 0.1–30 parts by weight of a reactive emulsifier and 0–5 parts by weight of a particle stabilizer are introduced together into a reactor and sufficiently stirred under a nitrogen atmosphere, followed by polymerizing the monomer to form initial particles. The polymerization process is performed at a temperature higher than a thermal decomposition temperature of the used initiator to generate free-radicals. For example, in case of using potassium sulfate with the decomposition temperature of about 40° C. as the initiator, the polymerization is carried out at 40° C. or higher. However, since a polymerization rate generally increases in proportion to polymerization temperature, the polymerization temperature during formation of the initial particles is maintained preferably in the range from 50 to 95° C. Provided that a redox catalyst is used, the polymerization may be performed at about 0° C.

The process of forming the initial particles determines the number of final polymers in a polymerization system, in which the amount of the monomer added initially is regulated in any suitable concentration ranges not reducing stability of polymerization. Typically, the amount of initially added monomer is limited to 1–50 wt % of the total amount of the monomer. If less than 1 wt % of monomer is used, the number of initial particles is so small to decrease polymerization rate. Meanwhile, more than 50 wt % of monomer is used, the polymerization temperature is drastically increased during formation of initial particles and convergence reaction may result. Such limitation of the amount of the initially added monomer is known in the art, and is not critical for accomplishing the present invention.

As the monomer, use may be made of acrylonitrile alone, or mixtures of acrylonitrile and another monomer containing a vinyl group capable of copolymerizing with acrylonitrile. Examples of the monomer copolymerizable with acrylonitrile include styrene, vinyl chloride, methyl methacrylate, butylmethacrylate, butylacrylate, isooctylacrylate, isobutylacrylate, hydroxyethylmethylacrylate, butadiene, and isoprene, which may be used alone or in any combination thereof.

Silicate used in the present invention is not limited so long as it has a layered structure for receiving a polymer. With the aim of easy intercalation of a polymer between silicate layers, an average space between the layers of silicate preferably ranges from 7 to 12 Å. In addition, silicate having excellent cation-exchange capacity is preferred. Silicate fulfilling the above qualifications is exemplified by montmorillonite, hectorite, saponite and fluorohectorite. These silicates may be used alone or in combinations thereof, according to requirements of the user.

In the present invention, as the reactive emulsifier, any emulsifier may be used so long as it has both of a radical-polymerizable vinyl group and a functional group with affinity for silicate. The non-limiting examples of functional group with affinity for silicate include an amide group and a sulfonic group. The reactive emulsifier containing such a functional group has high affinity for silicate and thus allows the monomer to be easily intercalated between layers of silicate. The reactive emulsifier with one or two or more functional groups mentioned above is selected from the group consisting of 2-acrylamido-2-methyl-1-propane sulfonic acid (hereinafter, abbreviated to "AMPS"), (3-acrylamidopropyl)trimethylammonium chloride, [2-(acryloyloxy)ethyl]trimethylammonium methyl sulfate, vinylbenzyltrimethylammonium chloride, 3-acrylamido-3-methylbutyltrimethyl-ammonium chloride, N,N-dialkylaminoethyl acrylate, N,N-dialkylaminoethyl methacrylate, N,N-dimethylaminoethyl acrylate, N,N-dimethylaminoethyl methacrylate, N,N-dimethylaminomethyl acrylamide, N,N-dimethylaminopropyl methacrylamide, 2-methacrylamidopropyltrimethylammonium chloride, and 1,1-(dimetyl)-1-(3-methacryloxy-ethyl)-1-(3-sulfopropyl) ammonium betaine. The emulsifier may be used alone or in mixtures thereof. Although the addition amount of the reactive emulsifier is not particularly limited, if the added amount is too small, exfoliation of silicate becomes difficult. On the other hand, if the amount is too much, viscosity of a polymerization system is increased and oligomers having low molecular weight may be formed in large quantities. Thus, in the present invention, the amount of the emulsifier is defined to the above range, but is not critically limited thereto.

The initiator required for initiation of radical polymerization of the monomer is not particularly limited, and is readily available to those skilled in the art. Examples of the initiator include ammonium persulfate, potassium persulfate, azobisisonitrile, and benzylperoxide.

At the completion of the formation of initial particles, to the reactor are added 0–5 parts by weight of a particle stabilizer, followed by addition of the remnant of the monomer in a continuous or intermittent manner. Then, 0–5 parts by weight of the initiator is added to polymerize all the monomer, thus providing high concentration of the nanocomposite. At this time, the polymerization temperature is the same as or higher than the initial polymerization temperature. The rate of addition of the monomer is controlled to give a conversion of polymerization of growing particles of 85–100%, on the basis of a known embodiment (Gardon theory, Step 3). The interior of the particles growing under such conditions is in a monomer-starved state, and thus, the additional monomers fed continuously or discretely in a incremental stage are incorporated into the previously formed particles and polymerized therein, thus forming stable polymer particles. However, the above addition rate is not critical in the present invention. In general, the amount of later-added monomer is the same as or higher than the amount of the monomer used in formation of the initial particles.

Further, at this incremental stage, there is required a certain stabilizer which surrounds the growing particles and provides driving force for diffusing the monomers charged in the incremental stage into the particles, if the colloidal stability of growing emulsion particles were deterred. Such a stabilizer may be added at the initial polymerization step and/or the later polymerization step. The stabilizer used in the present invention is preferably exemplified by linear alkylbenzene sulfonate-based anionic emulsifier which has a main chain of alkyl group or ethyleneoxide, non-ionic emulsifier, rosin soap, and fatty soap. Examples of the anionic emulsifier include sodium dodecyl benzenesulfonate, sodium laurate, sodium decylsulfonate, sodium dodecylsulfonate, etc. Examples of the non-ionic emulsifier include N-triethoxylated nonanamide, decylmethylsulfoxide, beta-dodecylmaltoside, etc.

In brief, the emulsion polymerization process of the present invention has the following advantages: first, interlayer space of layered silicate is widened in water used as a dispersion medium, and thus the monomer having low molecular weight can be easily intercalated between the layers; second, use of an organic solvent is not necessary; third, a reactive emulsifier having a functional group with affinity for silicate is used, whereby it is not necessary to make organo-modified silicates; fourth, the nanocomposite can be prepared on a large scale.

Having generally described this invention, a further understanding can be obtained by reference to certain specific examples which are provided herein for purposes of illustration only and are not intended to be limiting unless otherwise specified.

EXAMPLE 1

Preparation of Exfoliated Polyacrylonitrile/Silicate (100:5) Nanocomposite 5 g of montmorillonite (Kunipia-F, Kunimine Co., CEC= 119 meq/100) as a layered silicate was added to 145 ml of deionized water and stirred at room temperature for 24 hours, thereby uniformly dispersing montmorillonite in deionized water. Thus obtained montmorillonite-dispersion was introduced into a reactor so that the weight ratio of montmorillonite to monomer was 5:100. Thereafter, 10 parts by weight of aqueous 1% potassium sulfate solution as an initiator, 25 parts by weight of acrylonitrile as a monomer, 200 parts by weight of deionized water and 1.5 parts by weight of AMPS as a reactive emulsifier were introduced to the reactor, and stirred at room temperature under a nitrogen atmosphere for 1 hour, thereby uniformly dispersing each component in deionized water. After completion of the dispersion, the reaction temperature was adjusted to 65° C., and polymerization was conducted at that temperature for 1 hour to afford initial particles, to which 75 parts by weight of acrylonitrile was continuously introduced by use of a syringe pump at that temperature over 2 hours. After completion of the monomer introduction, emulsion polymerization was resumed for 2 hours, thus polymerizing all the monomer. The resulting polyacrylonitrile/silicate nanocomposite was freeze-dried for 1 week and then further dried in a vacuum oven at 100° C. for 24 hours or longer.

EXAMPLE 2

Preparation of Exfoliated Polyacrylonitrile/Silicate (100:10) Nanocomposite

A nanocomposite was prepared in the same manner as in the above example 1, except that the montmorillonite dispersion was introduced into the reactor so that the weight ratio of montmorillonite to monomer was 10:100.

EXAMPLE 3

Preparation of Exfoliated Polyacrylonitrile/silicate (100:20) Nanocomposite

A nanocomposite was prepared in the same manner as in the above example 1, except that the montmorillonite dispersion was introduced into the reactor so that the weight ratio of montmorillonite to monomer was 20:100.

EXAMPLE 4

Preparation of Exfoliated Styrene-Acrylonitrile Copolymer/Silicate (100:3) Nanocomposite 5 g of montmorillonite (Kunipia-F, Kunimine Co., CEC= 119 meq/100) as a layered silicate was added to 145 ml of deionized water and stirred at room temperature for 24 hours, thereby uniformly dispersing montmorillonite in deionized water. Thus obtained montmorillonite dispersion was introduced into a reactor so that the weight ratio of montmorillonite to monomer was 3:100. Then, 10 parts by weight of aqueous 1% potassium sulfate solution as an initiator, 25 parts by weight of acrylonitrile as a monomer, 200 parts by weight of deionized water and 1.5 parts by weight of AMPS as a reactive emulsifier were introduced into the reactor, and stirred at room temperature under a nitrogen atmosphere for 1 hour, thereby uniformly dispersing each component in deionized water. After completion of the dispersion, the reaction temperature was adjusted to 65° C., and polymerization was conducted at that temperature for 1 hour to afford initial particles, to which 75 parts by weight of a styrene:acrylonitrile=100:70 (w/w) mixture was continuously introduced by use of a syringe pump at that temperature over 2 hours. After completion of the monomer introduction, emulsion polymerization was resumed at 90° C. for 2 hours, thus polymerizing all the monomer. The resulting styrene-acrylonitrile copolymer/silicate nanocomposite was freeze-dried for 1 week and then further dried in a vacuum oven at 100° C. for 24 hours or longer.

EXAMPLE 5

Preparation of Exfoliated Styrene-Acrylonitrile Copolymer/Silicate (100:5) Nanocomposite A nanocomposite was prepared in the same manner as in the above example 4, except that the montmorillonite dispersion was introduced into the reactor so that the weight ratio of montmorillonite to monomer was 5:100.

EXAMPLE 6

Preparation of Exfoliated Styrene-Acrylonitrile Copolymer/Silicate (100:10) Nanocomposite A nanocomposite was prepared in the same manner as in the above example 4, except that the montmorillonite dispersion was introduced into the reactor so that the weight ratio of montmorillonite to monomer was 10:100.

TEST EXAMPLE 1

X-ray Diffraction Analysis

Figure 1B:
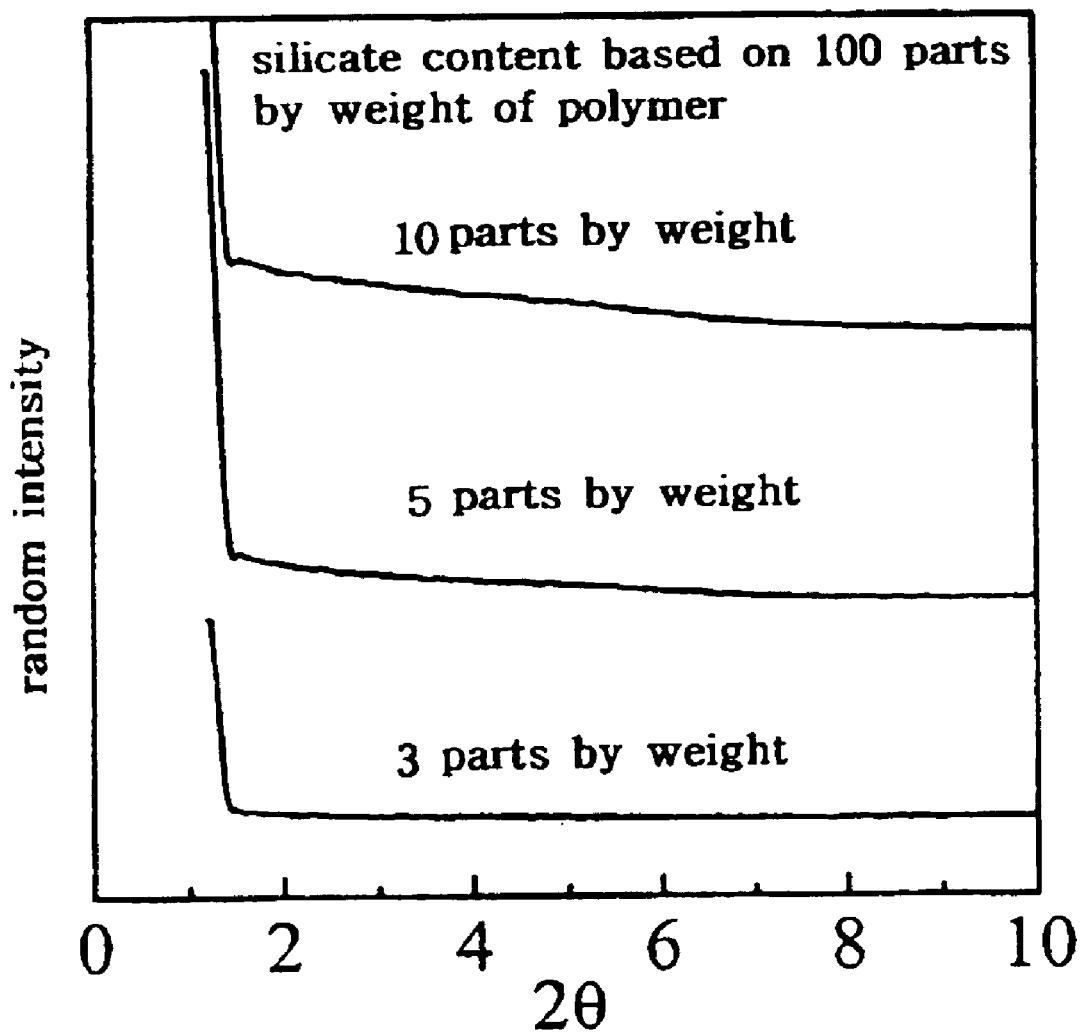
FIG. 1*b* shows X-ray diffraction patterns of exfoliated styrene-acrylonitrile copolymer/silicate nanocomposites according to the examples 4 to 6 of the present invention.

The polyacrylonitrile/silicate nanocomposites obtained by the above examples 1–3, and the styrene-acrylonitrile copolymer/silicate nanocomposite obtained by the above examples 4–6 were scanned by use of an X-ray diffractometer (Rigaku X-ray generator, CuKa radiation, $\lambda=0.15406$ nm), to obtain X-ray diffraction patterns showing distances between silicate layers, which are shown in FIGS. 1a and 1b. Interlayer space was measured under the conditions of a diffraction angle $2\theta$ of 1.2–10° and a scanning rate of 2°/min. In order to remove water or oligomers having low molecular weight causing wide lattice spacing, each sample was extracted with THF using a Soxhlet extractor for 12 hours before being analyzed.

As shown in FIGS. 1a and 1b, there are no peaks resulted from regular spacing of silicate layers. From this result, it is seen that silicate in each nanocomposite is completely exfoliated.

TEST EXAMPLE 2

Measurement of Elastic Modulus

Figure 2A:
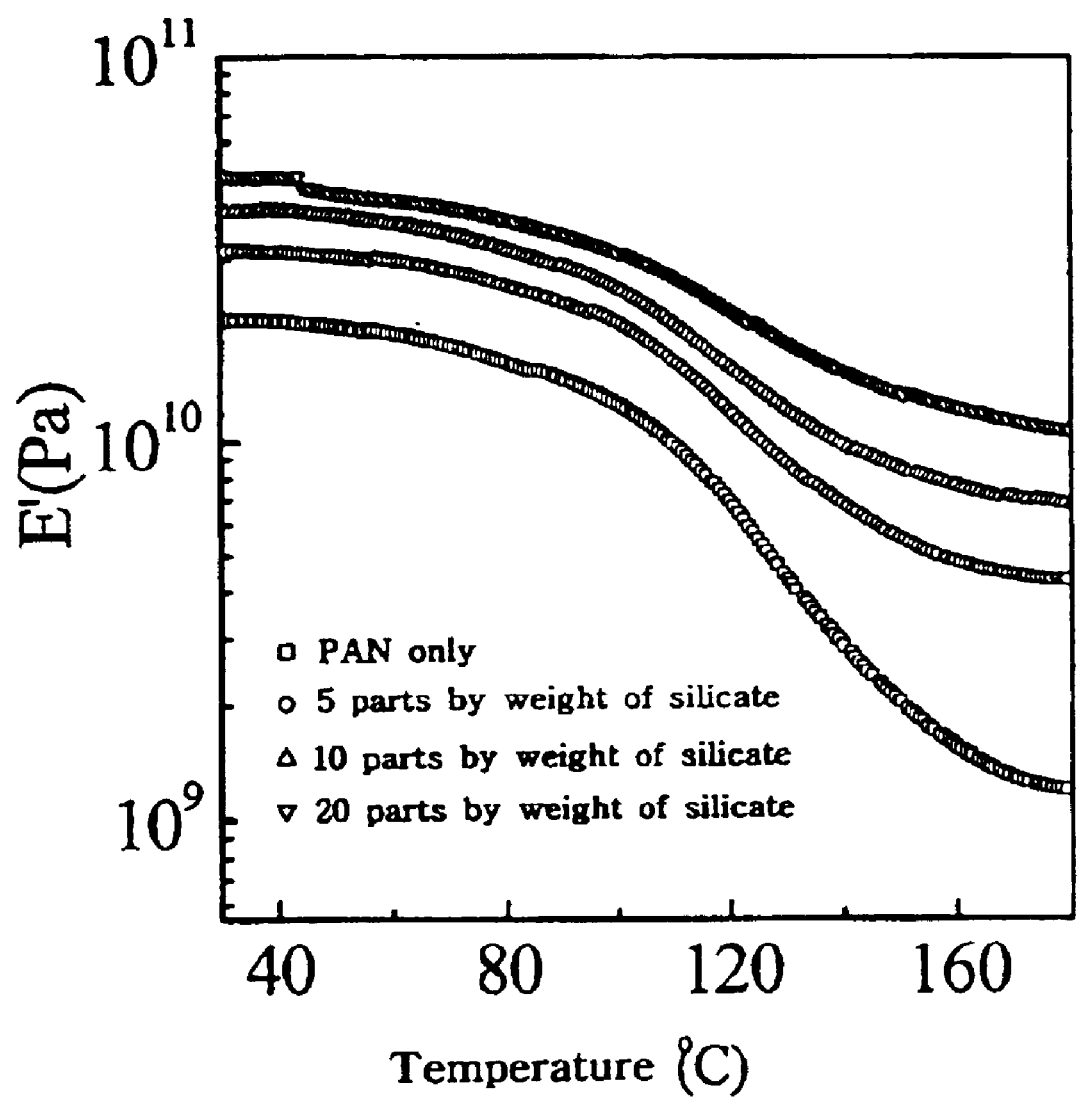
FIG. 2a is a graph showing variation of elastic modulus according to temperature, of exfoliated polyacrylonitrile/silicate nanocomposites according to the examples 1 to 3 of the present invention and commercially available polyacrylonitrile.
Figure 2B:
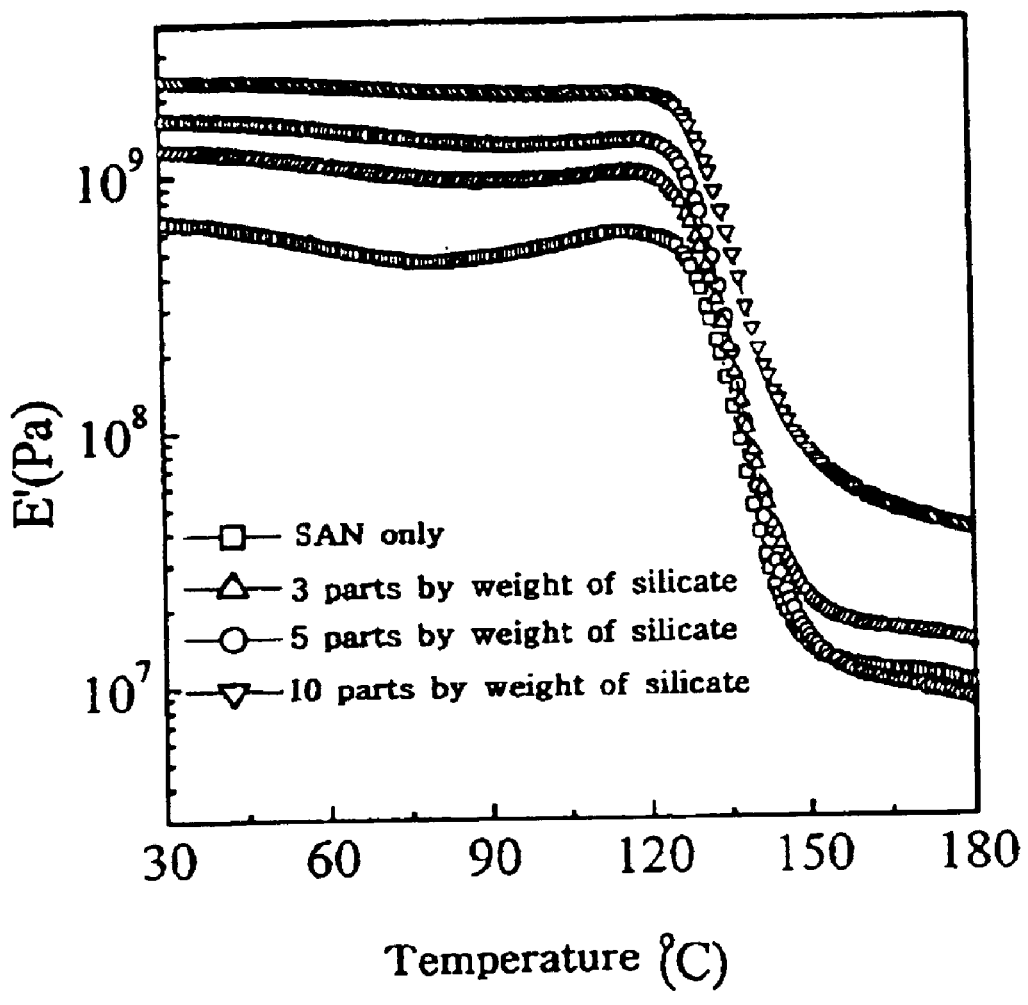
FIG. 2b is a graph showing variation of elastic modulus according to temperature, of exfoliated styrene-acrylonitrile copolymer/silicate nanocomposites according to the examples 4 to 6 of the present invention and commercially available styrene-acrylonitrile copolymer.

Elevating the temperature from 30° C. to 200° C. at a rate of 5° C./min, elastic moduli of the polyacrylonitrile/silicate nanocomposites obtained by the above examples 1–3 and the styrene-acrylonitrile copolymer/silicate nanocomposite obtained by the above examples 4–6, as well as those of commercially available polyacrylonitrile (PAN) and commercially available styrene-acrylonitrile copolymer (SAN) were measured using Rheometric Scientific DMTA4, and are shown in FIGS. 2a and 2b.

The exfoliated polyacrylonitrile/silicate nanocomposites containing each of 5, 10 and 20 parts by weight of silicate based on 100 parts by weight of polyacrylonitrile exhibited, respectively, 55, 100 and 250% increase in elastic modulus at 40° C., compared to the polymer without silicate. Also, the styrene-acrylonitrile copolymer/silicate nanocomposites containing each of 3, 5 and 10 parts by weight of silicate based on 100 parts by weight of styrene-acrylonitrile copolymer exhibited, respectively, 188, 256 and 369% increase in elastic modulus at 40° C., compared to the polymer without silicate.

As described above, the present invention allows an exfoliated nitropolymer/silicate nanocomposite to be prepared on a large scale by a simple process using a non-modified silicate. Thus prepared nanocomposite is lightweight and excellent in thermal and mechanical properties, and therefore may be applied to a wide variety of industrial fields requiring heat resistance or dimensional stability.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method of preparing an exfoliated acrylonitrile polymer/silicate nanocomposite, said method comprising the step of emulsion polymerizing at least one monomer constituting said polymer and at least one non-modified, layered silicate in the presence of at least one reactive emulsifier which comprises one or more selected form the group consisting of 2-acrylamido-2-methyl-1-propane sulfonic acid, (3-acrylamidopropyl)trimethylammonium chloride, [2-(acrloyloxy)ethyl]trimethylammonium methyl sulfate, vinylbenzyltrimethylammonium chloride, 3-acrylamido-3-methylbutyltrimethyl-ammonium chloride, N,N-dialkylaminoethyl acrylate, N,N-dialkylaminoethyl methacrylate, N,N-dimethylaminoethyl acrylate, N,N-dimethylaminoethyl methacrylate, N,N-dimethylaminomethyl acrylamide, N,N-dimethylaminopropyl methacrylamide, 2-methacrylamidopropyltrimethylammonium chloride, and 1,1-(dimethyl-1-(3-methacryloxy-ethyl)-1-(3-sulfopropyl) ammonium betaine.

2. The method according to claim 1, wherein said monomer comprises acrylonitrile.

3. The method according to claim 2, wherein said monomer further comprises one or more selected from the group consisting of styrene, vinyl chloride, nethyl methacrylate, butylmethacrylate, butylacrylate, isooctylacrylate, isobutylacrylate, hydroxyethylmethylacrylate, butadiene, and isoprene.

4. The method according to claim 1, wherein said non-modified, layered silicate has average interlayer space of 7–12 Å.

5. The method according to claim 4, wherein said silicate comprises one or more selected from the group consisting of montmorillonite, hectorite, saponite, and fluorohectorite.

6. The method according to claim 1, wherein said emulsion polymerization is initiated by the addition of one or more initiator selected from the group consisting of ammonium persulfate, potassium persulfate, azabisisonitrile, and benzylperoxide.

7. The method according to claim 1, wherein a particle stabilizer is added at the beginning of or in the process of said emulsion polymerization.

8. The method according to claim 7, wherein said particle stabilizer is a linear alkylbenzene sulfonate-based anionic emulsifier, a non-ionic emulsifier, a rosin soap, a fatty soap, or a mixture thereof.

9. The method according to claim 8, wherein said anionic emulsifier comprises one or more selected from the group consisting of sodium dodecyl benzenesulfonate, sodium laurate, sodium decylsulfonate, and sodium dodecylsulfonate.

10. The method according to claim 8, wherein said non-ionic emulsifier comprises one or more selected from the group consisting of N-triethoxylated nonanamide, decylmethylsulfoxide, and beta-dodecylmaltoside.

11. The method according to claim 1, wherein said emulsion polymerization is performed in a manner of seeded polymerization, semi-batch polymerization or batch polymerization.

12. An exfoliated acrylonitrile polymer/silicate nanocomposite prepared by the method according to claim 1.

* * * * *